US012769464B2

(12) United States Patent
Chang et al.

(10) Patent No.: US 12,769,464 B2
(45) Date of Patent: Oct. 20, 2026

(54) MEMORY ACCESS LATENCY ESTIMATION METHOD AND MEMORY ACCESS LATENCY ESTIMATION SYSTEM FOR ESTIMATING AN ACCESS LATENCY OF A MEMORY ACCORDING TO A PLURALITY OF COEFFICIENTS AND A PLURALITY OF INDEXES

(71) Applicant: MEDIATEK INC., Hsin-Chu (TW)

(72) Inventors: Chih-Chieh Chang, Hsinchu City (TW); You-Hong Sun, Hsinchu City (TW); Wen-Hsun Lin, Hsinchu City (TW); Chia-Ching Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 204 days.

(21) Appl. No.: 18/642,859

(22) Filed: Apr. 23, 2024

(65) Prior Publication Data

US 2024/0361927 A1 Oct. 31, 2024

Related U.S. Application Data

(60) Provisional application No. 63/498,029, filed on Apr. 25, 2023.

(51) Int. Cl.
*G06F 3/06* (2006.01)

(52) U.S. Cl.
CPC .......... *G06F 3/0625* (2013.01); *G06F 3/0653* (2013.01); *G06F 3/0673* (2013.01)

(58) Field of Classification Search
None
See application file for complete search history.

(56) References Cited

U.S. PATENT DOCUMENTS 11,133,083 B1 * 9/2021 Fitzpatrick ............... G11C 7/04
2020/0301606 A1 9/2020 Muthiah
2024/0055046 A1 * 2/2024 Rayaprolu ........... G11C 29/028

FOREIGN PATENT DOCUMENTS

CN 113505084 A 10/2021
TW 201216163 A1 4/2012

OTHER PUBLICATIONS

Li et al., Statistical DRAM Modeling, MEMSYS '19: Proceedings of the International Symposium on Memory Systems, Sep. 2019. (Year: 2019).*

(Continued)

*Primary Examiner* — Arpan P. Savla
*Assistant Examiner* — Edmund H Kwong
(74) *Attorney, Agent, or Firm* — Winston Hsu

(57) ABSTRACT

A memory access latency estimation method includes measuring a first access latency of a first access operation of a first memory, measuring a plurality of first indexes of the first memory corresponding to the first access operation, using a plurality of first coefficients and the plurality of first indexes to perform a first weighted calculation to generate a first estimated latency, adjusting the plurality of first coefficients to generate a plurality of updated first coefficients, using the plurality of updated first coefficients and the plurality of first indexes to perform the first weighted calculation to adjust the first estimated latency for the first estimated latency to approximate the first access latency, and using the plurality of updated first coefficients and a plurality of second indexes of the first memory to perform a second weighted calculation to generate a second estimated latency for a second access operation.

16 Claims, 6 Drawing Sheets

(56) References Cited

OTHER PUBLICATIONS

Karila Palma Silva et al., Value analysis for the determination of memory instruction latency in a WCET tool, 2015, pp. 252-257, IEEE, XP033218791 ,2015.
Huanxing Shen et al., Runtime Estimation of Application Memory Latency for Performance Analysis and Optimization, MEMSYS 2020, Sep. 28-Oct. 1, 2020, pp. 1-9, Washington, DC, USA, XP058583695 Sep. 28, 2020.

* cited by examiner

MEMORY ACCESS LATENCY ESTIMATION METHOD AND MEMORY ACCESS LATENCY ESTIMATION SYSTEM FOR ESTIMATING AN ACCESS LATENCY OF A MEMORY ACCORDING TO A PLURALITY OF COEFFICIENTS AND A PLURALITY OF INDEXES

CROSS REFERENCE TO RELATED APPLICATIONS

This application claims the benefit of U.S. Provisional Application No. 63/498,029, filed on Apr. 25, 2023. The content of the application is incorporated herein by reference.

BACKGROUND

When accessing a memory (e.g. DRAM), if the access latency of the memory is longer, the waiting time of a processor will be longer, increasing the power consumption of the processor. If the accessing frequency of memory is increased, the access latency may be reduced, but it will increase the power consumption of the memory. Since the access latency of the memory is related to the power consumption, it is helpful for managing power consumption to estimate the access latency correctly. However, it is a challenge to estimate and control the access latency of the memory, and a solution for controlling the access latency is still in need in the field.

SUMMARY

An embodiment provides a memory access latency estimation method. The memory access latency estimation method includes measuring a first access latency of a first access operation of a first memory; measuring a plurality of first indexes of the first memory corresponding to the first access operation, using a plurality of first coefficients and the plurality of first indexes to perform a first weighted calculation to generate a first estimated latency, adjusting the plurality of first coefficients to generate a plurality of updated first coefficients, using the plurality of updated first coefficients and the plurality of first indexes to perform the first weighted calculation to adjust the first estimated latency for the first estimated latency to approximate the first access latency, and using the plurality of updated first coefficients and a plurality of second indexes of the first memory to perform a second weighted calculation to generate a second estimated latency for a second access operation. Number and types of the plurality of first indexes are the same as number and types of the plurality of second indexes, the plurality of second indexes are corresponding to the second access operation, and the first access operation precedes the second access operation.

Another embodiment provides a memory access latency estimation system including a first monitor, a plurality of second monitors and a processor. The first monitor is used to measure a first access latency of a first access operation of a first memory. The plurality of second monitors are used to measuring a plurality of first indexes of the first memory corresponding to the first access operation. The processor is used to use a plurality of first coefficients and the plurality of first indexes to perform a first weighted calculation to generate a first estimated latency, adjust the plurality of first coefficients to generate a plurality of updated first coefficients in order to use the plurality of updated first coefficients and the plurality of first indexes to perform the first weighted calculation to adjust the first estimated latency for the first estimated latency to approximate the first access latency, and use the plurality of updated first coefficients and a plurality of second indexes of the first memory to perform a second weighted calculation to generate a second estimated latency for a second access operation. Number and types of the plurality of first indexes are the same as number and types of the plurality of second indexes, the plurality of second indexes are corresponding to the second access operation, and the first access operation precedes the second access operation.

Another embodiment provides a memory access latency estimation method, including measuring a plurality of first indexes of a first memory, measuring a plurality of second indexes of a second memory, obtaining a relationship between the plurality of first indexes of the first memory and the plurality of second indexes of the second memory, and generating a plurality of second coefficients for the second memory according to the relationship and a plurality of first coefficients of the first memory. The plurality of second coefficients are used to estimate an access latency of the second memory, and number and the types of the plurality of first indexes are the same as number and types of the plurality of second indexes.

These and other objectives of the present invention will no doubt become obvious to those of ordinary skill in the art after reading the following detailed description of the preferred embodiment that is illustrated in the various figures and drawings.

DETAILED DESCRIPTION

In the text, a bandwidth may be an amount of data transmitted per unit time. The larger the bandwidth, the more data may be transmitted per unit time. In the text, an asterisk (i.e. *) may be the multiplication sign. In the text, a neural network model or a machine learning model may include hardware and software integrated in a model and used for machine learning. For example, a neural network model may include a convolutional neural network (CNN), a recurrent neural network (RNN), a deep neural network (DNN) and/or a proper neural network model.

Figure 1:
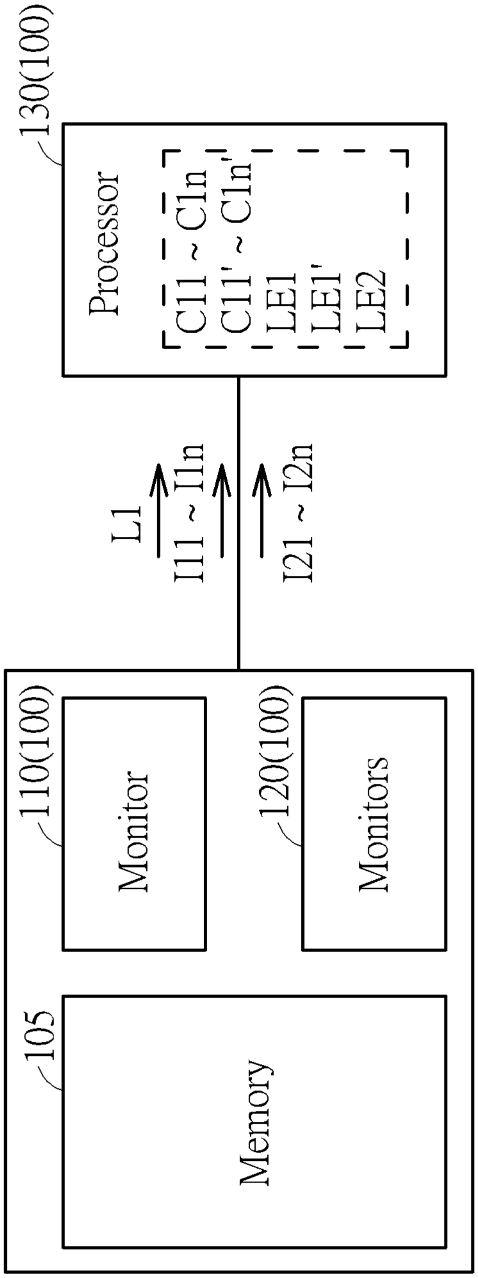
FIG. 1 illustrates a memory access latency estimation system for controlling a first memory according to an embodiment.

FIG. 1 illustrates a memory access latency estimation system 100 for controlling a first memory 105 according to an embodiment. The memory access latency estimation system 100 may include a monitor 110, a plurality of monitors 120 and a processor 130.

The monitor 110 may measure an access latency L1 of an access operation of the first memory 105. The monitors 120 may measure a plurality of indexes I11 to I1$n$ of the first memory 105 corresponding to the access operation. Here, the access latency L1 is an actual latency obtained by measurement instead of by estimation.

The processor 130 may use a plurality of coefficients C11 to C1$n$ and the indexes I11 to I1$n$ to perform a weighted calculation to generate an estimated latency LE1. The weighted calculation may be expressed as the following equation eq-1.

$$LE1 = C11*I11 + C12*I12 + \ldots + C1n*I1n. \qquad \text{eq-1}$$

The processor 130 may adjust the coefficients C11 to C1$n$ to generate a plurality of updated coefficients C11' to C1$n$' in order to use the updated coefficients C11' to C1$n$' and the indexes I11 to I1$n$ to perform the weighted calculation to adjust the estimated latency LE1 to generate an updated estimated latency LE1' for the updated estimated latency LE1' to approximate the access latency L1. The weighted calculation with the updated coefficients C11' to C1$n$' may be expressed as the following equation eq-2.

$$LE1' = C11'*I11 + C12'*I12 + \ldots + C1n'*I1n. \qquad \text{eq-2}$$

The updated coefficients C11' to C1$n$' may be further adjusted by a machine learning model (e.g. neural network model) of the processor 130 to further adjust the updated estimated latency LE1' for the updated estimated latency LE1' to be closer to the access latency L1. The updated coefficients C11' to C1$n$' may be adjusted and improved recursively to adjust the updated estimated latency LE1' to be closer to the actual access latency L1.

After the updated coefficients C11' to C1$n$' are generated, the updated coefficients C11' to C1$n$' may be used to generate an estimated latency for the first memory 105.

The processor 130 may use the updated coefficients C11' to C1$n$' and a plurality of indexes I21 to I2$n$ of the first memory 105 to perform a weighted calculation to generate an estimated latency LE2 for a later access operation. The weighted calculation may be expressed as the following equation eq-3.

$$LE2 = C11'*I21 + C12'*I22 + \ldots + C1n'*I2n. \qquad \text{eq-3}$$

Here, the estimated latency LE2 is an estimated latency instead of an actual latency obtained through measurement. The estimated latency LE2 corresponding to the access operation may be generated before an actual latency is measured. The estimated latency LE2 may be used by the processor 130 to manage and reduce the power consumption of the later access operation of the first memory 105.

After the later access operation is completed, an actual latency of the new access operation may be measured, for example, by the monitor 110. The updated coefficients C11' to C1$n$' may be further adjusted and improved according to the estimated latency LE2 and the actual latency of the later access operation to adjust the result of the equations eq-3 to be closer to the actual latency. Hence, subsequent estimations will be more accurate with the updated coefficients. In the process, the adjustment of the coefficients and the related calculations may be performed using the neural network model in the processor 130.

In the process, the number and the types of the indexes I11 to I1$n$ may be the same as the number and the types of the indexes I21 to I2$n$. The access operation with the latency L1 may precede the later access operation. The updated coefficients (e.g. C11' to C1$n$') may be used to generate the estimated latency LE2 for the later access operation to improve power management and controls related to data accessing of the first memory 105. The types of the indexes I11 to I1$n$ and the indexes I21 to I2$n$ will be described below.

After the updated coefficients C11' to C1$n$' for the first memory 105 are obtained, an access latency of a second memory 205 may be estimated according to the result of optimizing the estimation of the access latency for the first memory 105.

Figure 2:
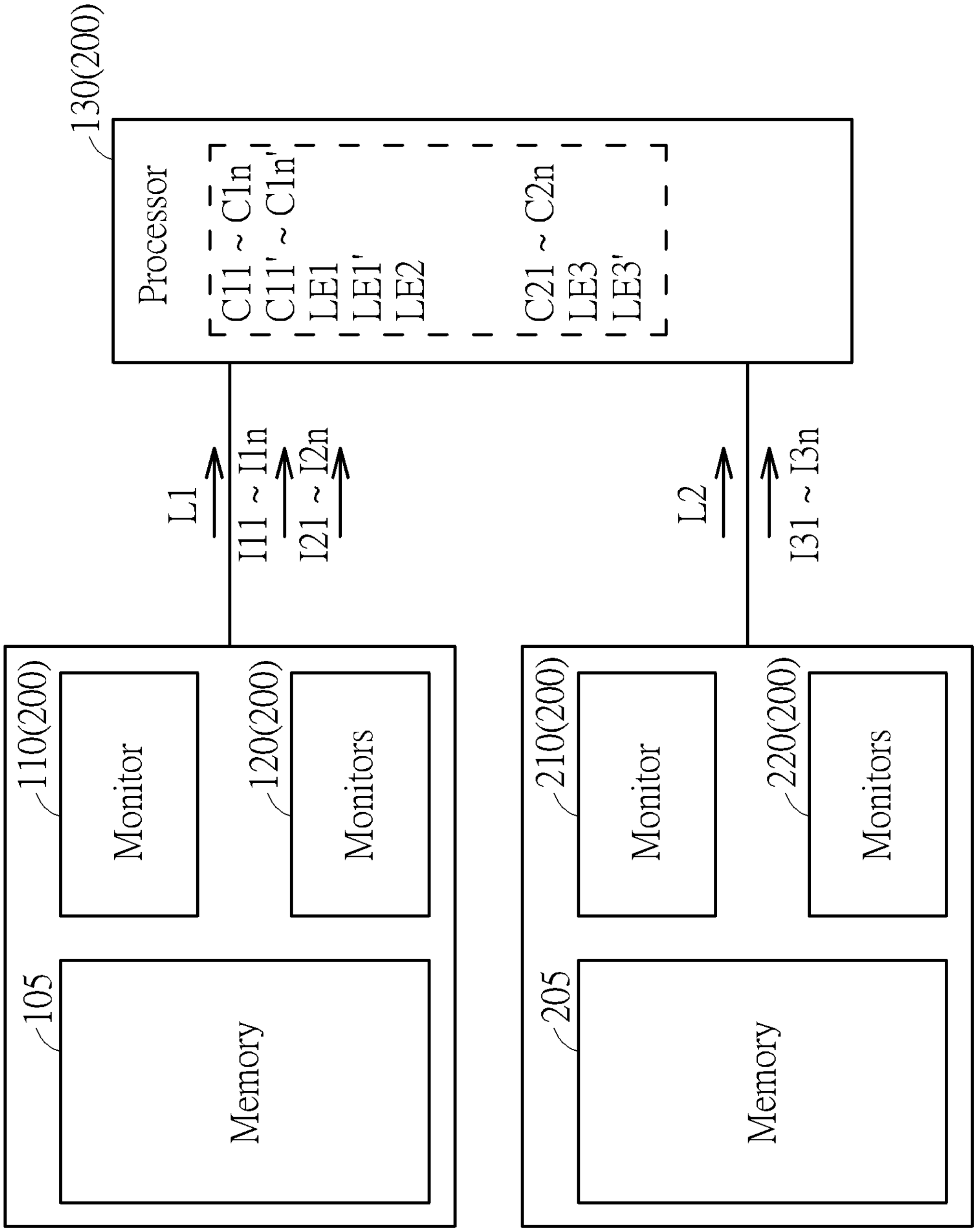
FIG. 2 illustrates a memory access latency estimation system for controlling the first memory and a second memory according to another embodiment.

FIG. 2 illustrates a memory access latency estimation system 200 for controlling the first memory 105 and a second memory 205 according to another embodiment. In FIG. 2, the first memory 105, the monitor 110 and the monitors 120 may be similar to that in FIG. 1. Compared to the memory access latency estimation system 100, the memory access latency estimation system 200 may further include a monitor 210 and a plurality of monitors 220.

The monitor 210 may measure an access latency L2 of an access operation of the second memory 205. The monitors 220 may measure a plurality of indexes I31 to I3$n$ of the second memory 205 corresponding to the access operation of the second memory 205.

The processor 130 may further use the foresaid updated coefficients C11' to C1$n$' (corresponding to the first memory 105) and the indexes I31 to I3$n$ (corresponding to the second memory 205) to perform an weighted calculation to generate an estimated latency LE3 for the second memory 205, and weighted calculation may be expressed as the following equation eq-4.

$$LE3 = C11'*I31 + C12'*I32 + \ldots + C1n'*I3n. \qquad \text{eq-4}$$

The processor 130 may adjust the updated coefficients C11' to C1$n$' to generate a plurality of coefficients C21 to C2$n$. Then, the processor 130 may use the coefficients C21 to C2$n$ and the indexes I31 to I3$n$ to perform the weighted calculation (e.g. eq-4) to adjust the estimated latency LE3 to approximate the access latency L2, and the calculation may be expressed as the following equation eq-5.

$$LE3' = C21*I31 + C22*I32 + \ldots + C2n*I3n. \qquad \text{eq-5}$$

In the equation eq-5, the estimated latency LE3' may be generated using the coefficients C21 to C2$n$, and the estimated latency LE3' may be closer to the access latency L2 (i.e. actual latency) than the estimated latency LE3.

After generating the coefficients C21 to C2$n$, the processor 130 may obtain and store a relationship between the updated coefficients C11' to C1$n$' and the coefficients C21 to C2$n$. The updated coefficients C11' to C1$n$' are corresponding to the first memory 105, and the coefficients C21 to C2$n$ are corresponding to the second memory 205. The relationship may be expressed as a function f( ), and the relationship between the updated coefficients C11' to C1n' and the coefficients C21 to C2n may be expressed as the following equation eq-6.

$$f(C11', C12', C13', \ldots, C1n') = (C21, C22, \ldots, C2n). \quad \text{eq-6}$$

After obtaining the relationship (i.e. the function f( )) between the coefficients for the first memory 105 (e.g. C11' to C1n') and the coefficients for the second memory 205 (e.g. C21 to C2n), the processor 130 may estimate a group of coefficients corresponding to the second memory 205 according to a group of coefficients corresponding to the first memory 105 and the relationship f( ).

For example, if a first chip having the first memory 105 is modified and upgraded to design a second chip having the second memory 205, the coefficients for estimating the latency of the first memory 105 in the first chip may be converted to the coefficients for estimating the latency of the second memory 205 in the second chip. Optionally, the coefficients for estimating the latency of the second memory 205 in the second chip may be further adjusted to be more accurate. As a result, resources used for generating the coefficients for estimating the access latency of the second memory 205 are reduced.

The processor 130, the monitors 110, 120, 210 and 220 may be implemented using hardware such as circuits. Appropriate software and/or firmware may be installed in the processor 130, and the monitors 110, 120, 210 and 220 to perform related operations. The first memory 105 and the second memory 205 may be dynamic random-access memories, such as DDR (double data rate) memories. The processor 130 may include a central processing unit (CPU), a graphic processing unit (GPU), a tensor processing unit (TPU), a neural network processing unit (NPU), an application specific integrated circuit (ASIC), a deep learning processing unit (DPU), a vector processing unit (VPU), a microprocessor, a micro controller unit (MCU) and/or an appropriate processing unit.

Regarding the indexes I11 to I1n, the indexes I21 to I2n, and the indexes I31 to I3n, at least one of the indexes may include a bandwidth of a corresponding memory (e.g. the first memory 105 or the second memory 205).

Regarding the indexes I11 to I1n, the indexes I21 to I2n, and the indexes I31 to I3n, at least one of the indexes may include a reciprocal of an operation frequency of a corresponding memory (e.g. the first memory 105 or the second memory 205).

Regarding the indexes I11 to I1n, the indexes I21 to I2n, and the indexes I31 to I3n, at least one of the indexes may include a reciprocal of an operation frequency of an interface for a corresponding memory (e.g. the first memory 105 or the second memory 205). For example, the interface may include an external memory interface (EMI).

Regarding the indexes I11 to I1n, the indexes I21 to I2n, and the indexes I31 to I3n, at least one of the indexes may include a reciprocal of a parameter corresponding to a transaction priority of a corresponding memory (e.g. the first memory 105 or the second memory 205). A transaction priority of a memory may refer to the priority levels assigned to memory operations in a system, and it may determine the order in which different tasks or processes access memory resources, ensuring that more critical or time-sensitive operations take precedence.

Regarding the indexes I11 to I1n, the indexes I21 to I2n, and the indexes I31 to I3n, at least one of the indexes may include a parameter corresponding to variety of access patterns of a corresponding memory (e.g. the first memory 105 or the second memory 205). In computer engineering, a memory access pattern may be the pattern with which a system or program reads and writes a memory.

Regarding the indexes I11 to I1n, the indexes I21 to I2n, and the indexes I31 to I3n, at least one of the indexes may include a squared value of the bandwidth of a corresponding memory (e.g. the first memory 105 or the second memory 205).

Regarding the indexes I11 to I1n, the indexes I21 to I2n, and the indexes I31 to I3n, at least one of the indexes may include a ratio of a frequency of a corresponding memory (e.g. the first memory 105 or the second memory 205) to a frequency of an interface. For example, the frequency of the memory may be a frequency of a DDR (double data rate) memory, and the frequency of the interface may be a frequency of an external memory interface (EMI).

Regarding the indexes I11 to I1n, the indexes I21 to I2n, and the indexes I31 to I3n, at least one of the indexes may include the square of a ratio of the frequency of a corresponding memory to the frequency of an interface.

Regarding the indexes I11 to I1n, the indexes I21 to I2n, and the indexes I31 to I3n, at least one of the indexes may include a ratio of a first value to a second value, the first value is a smaller one of the number of read operations and the number of write operations, and the second value is a larger one of the number of read operations and the number of write operations. In other words, when the number of write operations is close to the number of read operations, the access latency may be longer since the operation mode of the memory should be switched frequently. When one of the number of read operations and the number of write operations is much greater than the other, the access latency may be shorter since the operation mode of the memory is less switched.

Figure 3:
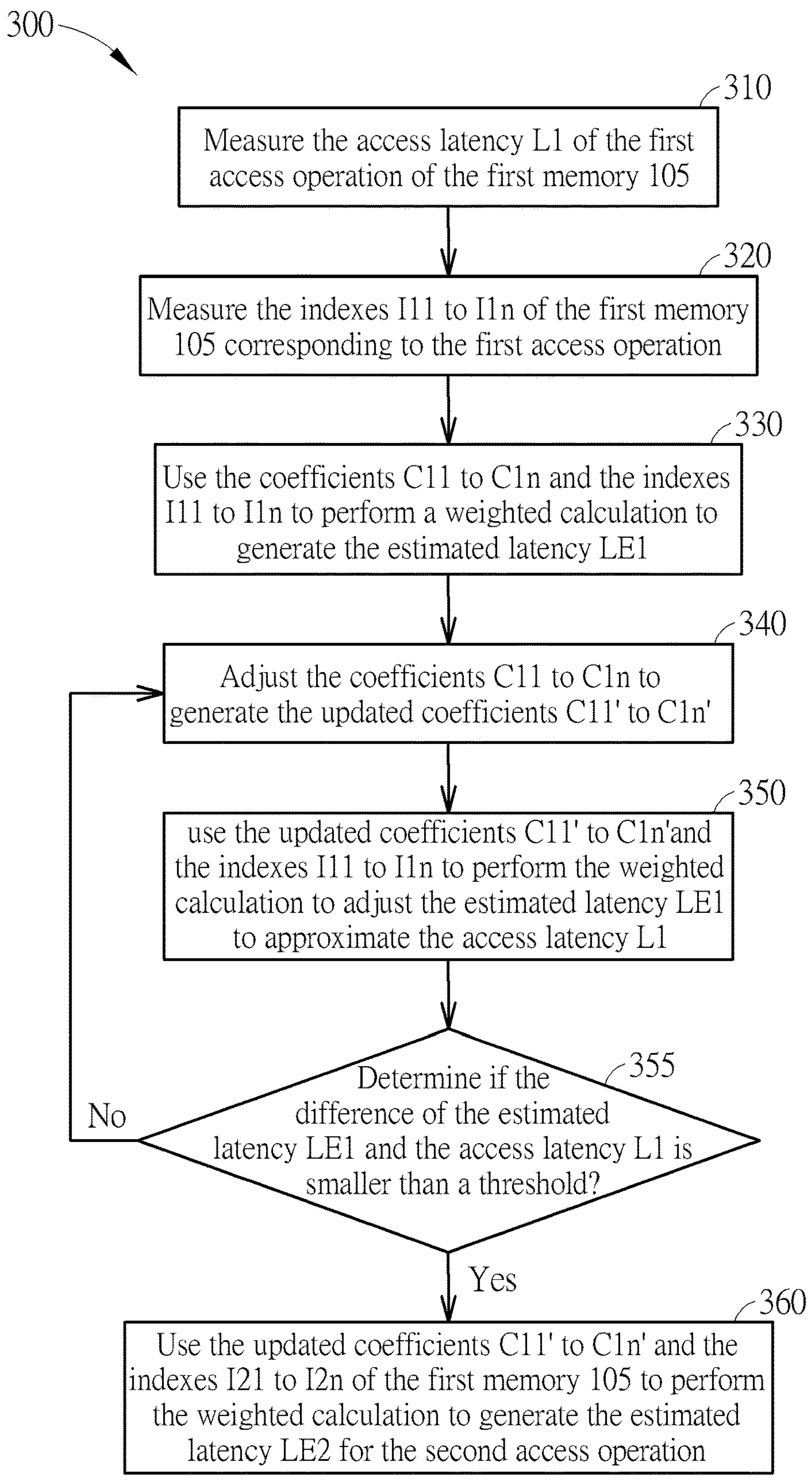
FIG. 3 illustrates a flowchart of a memory access latency estimation method for the memory access latency estimation system in FIG. 1 according to an embodiment.

FIG. 3 illustrates a flowchart of a memory access latency estimation method 300 for the memory access latency estimation system 100 in FIG. 1 according to an embodiment. The memory access latency estimation method 300 may include the following steps.

Step 310: measure the access latency L1 of the first access operation of the first memory 105;

Step 320: measure the indexes I11 to I1n of the first memory 105 corresponding to the first access operation;

Step 330: use the coefficients C11 to C1n and the indexes I11 to I1n to perform a weighted calculation to generate the estimated latency LE1;

Step 340: adjust the coefficients C11 to C1n to generate the updated coefficients C11' to C1n';

Step 350: use the updated coefficients C11' to C1n' and the indexes I11 to I1n to perform the weighted calculation to adjust the estimated latency LE1 to approximate the access latency L1;

Step 355: determine if the difference of the estimated latency LE1 and the access latency L1 is smaller than a threshold? If so, enter Step 360; otherwise, enter Step 340; and Step 360: use the updated coefficients C11' to C1n' and the indexes I21 to I2n of the first memory 105 to perform the weighted calculation to generate the estimated latency LE2 for the second access operation.

In Step 310 to Step 355, the processor 130 may perform optimization to generate the updated coefficients C11' to C1n' to make the estimated access latency closer to the actual access latency. Optionally, Step 355 may be omitted.

In Step 360, the updated coefficients C11' to C1$n$' may be used to generate the estimated latency LE2 for the second access operation of the first memory 105 before the actual access latency is measured, and the estimated latency LE2 may be used to control the memory 105 and manage the power consumption.

Figure 4:
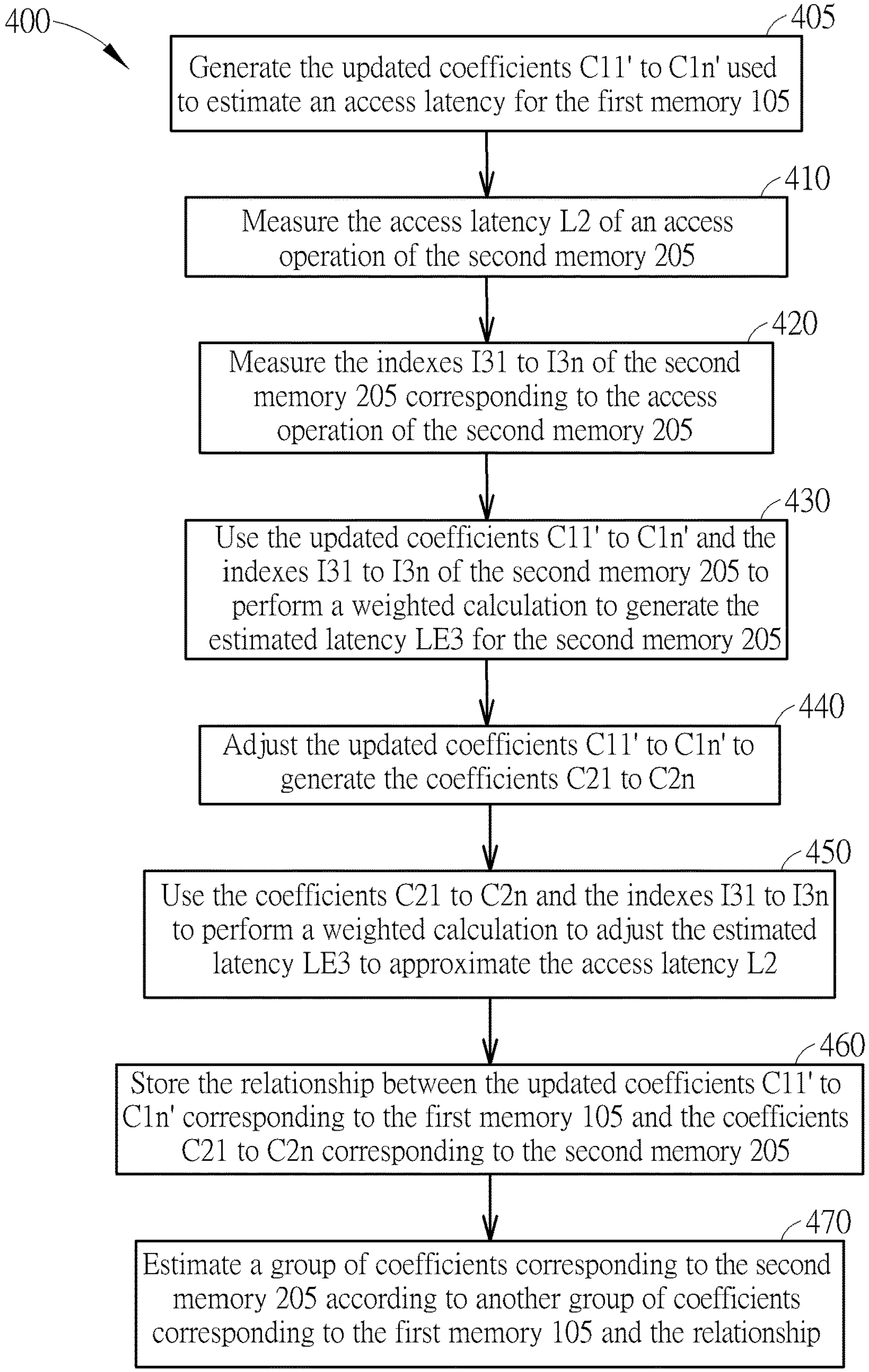
FIG. 4 illustrates a flowchart of a method for the memory access latency estimation system in FIG. 2 according to another embodiment.

FIG. 4 illustrates a flowchart of a memory access latency estimation method 400 for the memory access latency estimation system 200 in FIG. 2 according to another embodiment. The method 400 may include the following steps.

Step 405: generate the updated coefficients C11' to C1$n$' used to estimate an access latency for the first memory 105;

Step 410: measure the access latency L2 of an access operation of the second memory 205;

Step 420: measure the indexes I31 to I3$n$ of the second memory 205 corresponding to the access operation of the second memory 205;

Step 430: use the updated coefficients C11' to C1$n$' and the indexes I31 to I3$n$ of the second memory 205 to perform a weighted calculation to generate the estimated latency LE3 for the second memory 205;

Step 440: adjust the updated coefficients C11' to C1$n$' to generate the coefficients C21 to C2$n$;

Step 450: use the coefficients C21 to C2$n$ and the indexes I31 to I3$n$ to perform a weighted calculation to adjust the estimated latency LE3 to approximate the access latency L2;

Step 460: store the relationship (e.g. the abovementioned f( )) between the updated coefficients C11' to C1$n$' corresponding to the first memory 105 and the coefficients C21 to C2$n$ corresponding to the second memory 205; and Step 470: estimate a group of coefficients corresponding to the second memory 205 according to another group of coefficients corresponding to the first memory 105 and the relationship.

Step 405 may include Step 310 to Step 355 of FIG. 3 to generate and optimize the updated coefficients C11' to C1$n$' used to estimate the access latency of the first memory 105. Optionally, Step 440 and Step 450 may be performed repeatedly to adjust the coefficients C21 to C2$n$ until a difference of the generated estimated access latency (e.g. LE3) and the actual access latency L2 is smaller than a threshold. In Step 460, the neural network model in the processor 130 may be used to analyze and generate the relationship (e.g. the abovementioned function f( )). In Step 460, the function (e.g. the function f( )) of the relationship may be generated according to a posterior probability and/or linear regression using a machine learning model and/or a neural network model of the processor 130. In Step 470, the relationship (e.g. the function f( )) may be applied to find the group of coefficients corresponding to the second memory 205 for estimating the access latency for the second memory 205.

Figure 5:
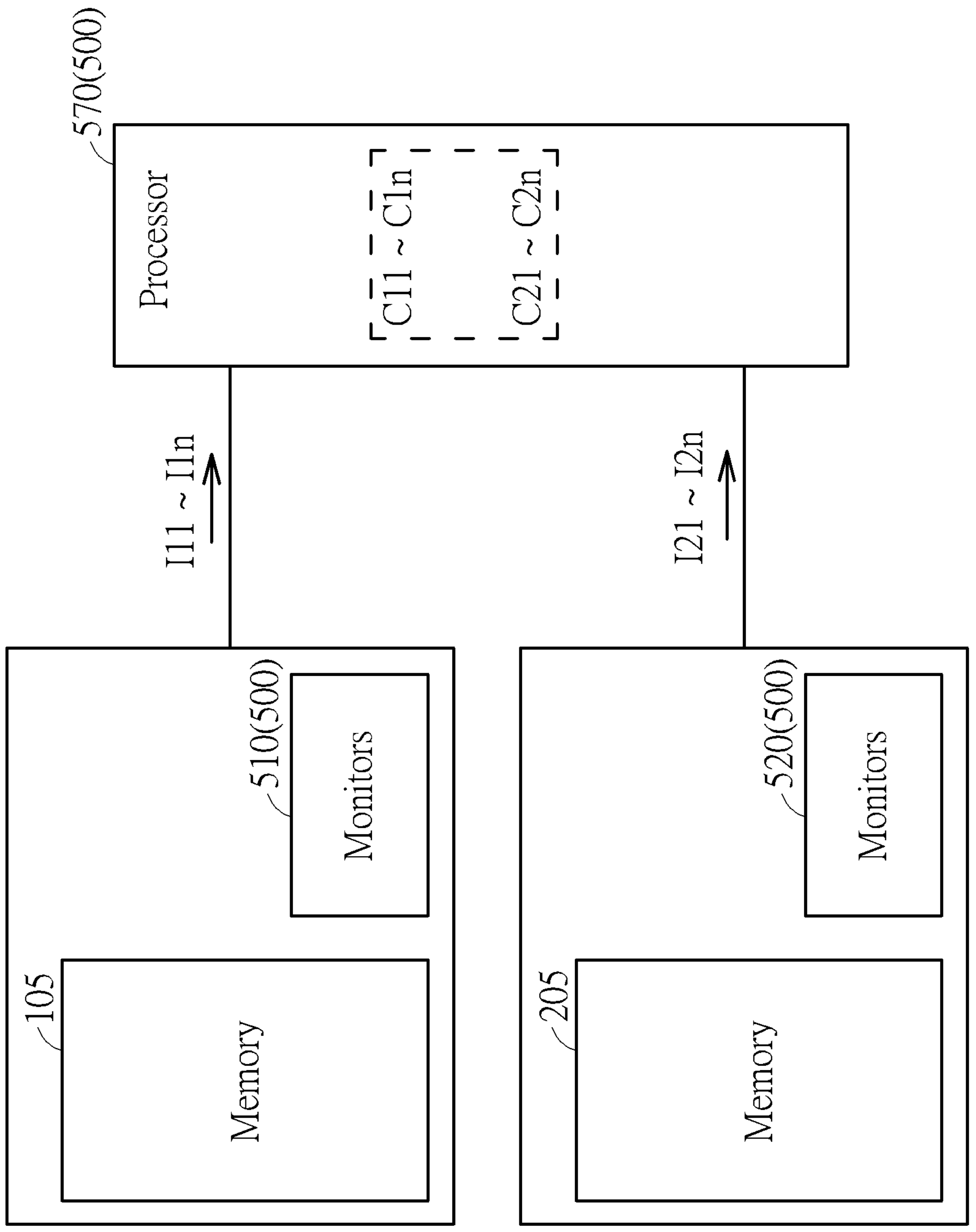
FIG. 5 illustrates a memory access latency estimation system for controlling the first memory and a second memory according to another embodiment.
Figure 6:
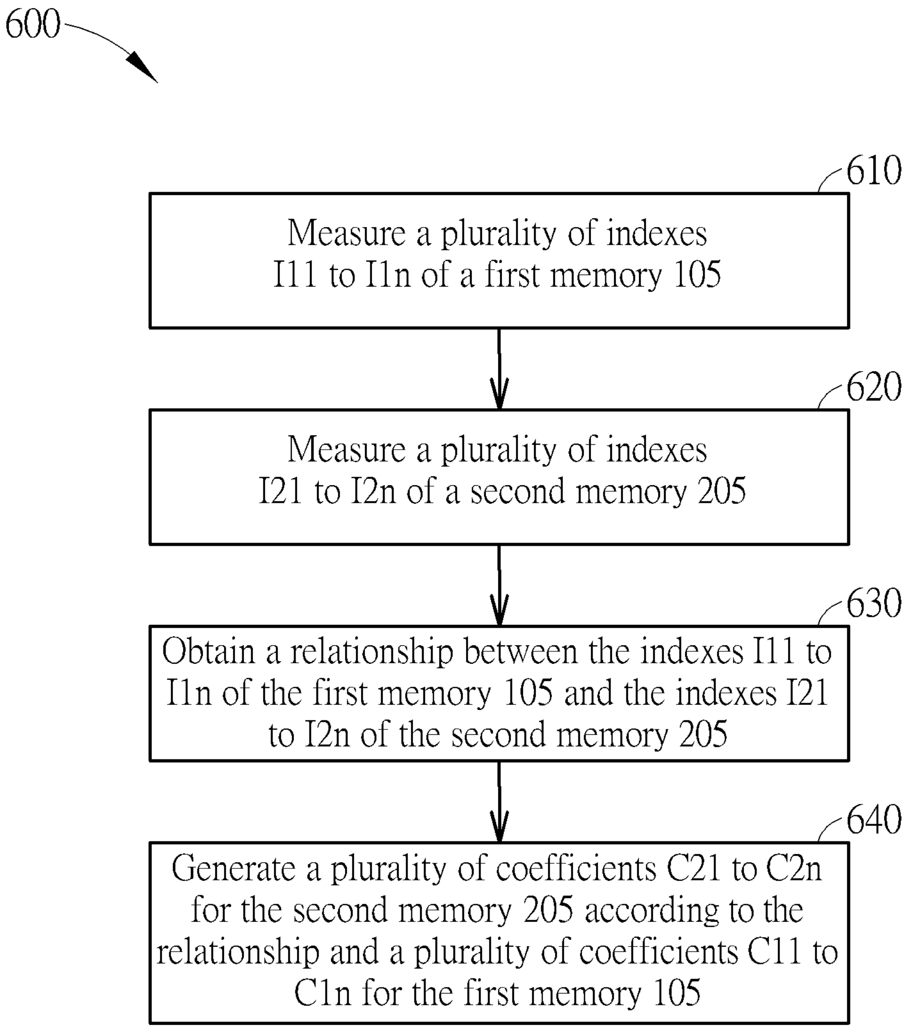
FIG. 6 illustrates a flowchart of a memory access latency estimation method for the memory access latency estimation system in FIG. 5.

FIG. 5 illustrates a memory access latency estimation system 500 for controlling the first memory 105 and a second memory 205 according to another embodiment. The memory access latency estimation system 500 can include monitors 510, monitors 520 and a processor 570. FIG. 6 is a flowchart of a memory access latency estimation method 600 for the memory access latency estimation system 500 in FIG. 5. The memory access latency estimation method 600 may include the following steps.

Step 610: measure a plurality of indexes I11 to I1$n$ of a first memory 105;

Step 620: measure a plurality of indexes I21 to I2$n$ of a second memory 205;

Step 630: obtain a relationship between the indexes I11 to I1$n$ of the first memory 105 and the indexes I21 to I2$n$ of the second memory 205; and Step 640: generate a plurality of coefficients C21 to C2$n$ for the second memory 205 according to the relationship and a plurality of coefficients C11 to C1$n$ for the first memory 105.

In FIG. 5 and FIG. 6, the memory 105 can be embedded in a first chip, and the second memory 205 can be embedded in a second chip. For example, if the first chip is modified and upgraded to design the second chip, the coefficients for estimating the latency of the first memory 105 in the first chip may be converted to the coefficients for estimating the latency of the second memory 205 in the second chip.

Prior to Step 610, a known formula can be used to calculate the access latency of the first memory 105. In this formula, number and types of the indexes I11 to I1$n$ can be fixed. In this formula, the coefficients C11 to C1$n$, which are used to calculate the access latency of the first memory 105, have been optimized and are now fixed. This formula can be applied for a weighted calculation, for instance, the calculation like C11*I11+C12*I12+ . . . +C1$n$*I1$n$ to generate the access latency of the first memory 105.

In Step 610, the monitors 510 can measure the first memory 105 to generate the indexes I11 to I1$n$. The characteristics of the first memory 105 can be measured according to the indexes I11 to I1$n$.

In Step 620, the monitors 520 can measure the second memory 205 to generate the indexes I21 to I2$n$. The characteristics of the second memory 205 can be measured according to the indexes I21 to I2$n$.

In Step 630, the relationship can correspond to a mapping between the characteristics of the first memory 105 and the second memory 205.

In Step 630, a neural network model in the processor 570 may be used to analyze and generate the relationship between the indexes I11 to I1$n$ (of the first memory 105) and the indexes I21 to I2$n$ (of the second memory 205). In Step 630, the relationship may be a function generated according to a posterior probability and/or linear regression using a machine learning model and/or a neural network model of the processor 570. The relationship in Step 630 can be expressed as a function and a formula.

The number and the types of the indexes I11 to I1$n$ can be the same as the number and types of the indexes I21 to I2$n$.

In Step 640, the coefficients C21 to C2$n$ for the second memory 205 can be generated according to the known coefficients C11 to C1$n$ of the first memory 105 and the relationship obtained in Step 630.

After obtaining the coefficients C21 to C2$n$, the coefficients C21 to C2$n$ can be used to estimate the access latency of the second memory 205. The coefficients C21 to C2$n$ and a group of measured indexes I21' to I2$n$' of the second memory 205 can be used to perform a weighted calculation to estimate the access latency of the second memory 205. For example, the estimated access latency of the second memory 205 can be generated with a formula such as C21*I21'+C22*I22'+ . . . +C2$n$*I2$n$'.

In summary, with the memory access latency estimation system 100 and the memory access latency estimation method 300, an access latency of an access operation of a memory may be estimated. With the memory access latency estimation system 200 and the memory access latency estimation method 400, the coefficients for estimating the access latency for the second memory 205 may be generated according to known coefficients for the first memory 105. With the memory access latency estimation system 500 and the memory access latency estimation method 600, the coefficients for estimating the access latency of the second memory 205 can be generated according to known coefficients for the first memory 105. Hence, the effort for calculating the coefficients for the second memory 205 is effectively reduced. Hence, an improved solution for estimating memory access latency is provided based on machine learning and neural network model, and it is helpful for power management to reduce the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory access latency estimation method of a memory access latency estimation system, the memory access latency estimation system comprising a first monitor, a plurality of second monitors, and a processor, the processor being hardware-implemented, the processor comprising a member selected from a group comprising a central processing unit (CPU), a graphic processing unit (GPU), a tensor processing unit (TPU), a neural network processing unit (NPU), an application specific integrated circuit (ASIC), a deep learning processing unit (DPU), a vector processing unit (VPU), and a microprocessor, the memory access latency estimation method comprising:

measuring, by the first monitor, a first access latency of a first access operation of a first memory, wherein the first memory comprises a dynamic random-access memory;

measuring, by the plurality of second monitors, a plurality of first indexes of the first memory corresponding to the first access operation;

using, by the processor, a plurality of first coefficients and the plurality of first indexes to perform a first weighted calculation to generate a first estimated latency;

adjusting, by the processor using a machine learning model implemented in hardware circuitry of the processor, the plurality of first coefficients to generate a plurality of updated first coefficients;

using, by the processor, the plurality of updated first coefficients and the plurality of first indexes to perform the first weighted calculation to adjust the first estimated latency for the first estimated latency to approximate the first access latency; and using, by the processor, the plurality of updated first coefficients and a plurality of second indexes of the first memory to perform a second weighted calculation to generate a second estimated latency for a second access operation;

wherein number and types of the plurality of first indexes are the same as number and types of the plurality of second indexes, the plurality of second indexes are corresponding to the second access operation, and the first access operation precedes the second access operation.

2. The method of claim 1, further comprising:

determining, by the processor, if a difference of the first estimated latency and the first access latency is smaller than a threshold; and if the difference is not smaller than the threshold, the processor adjusting the plurality of updated first coefficients to adjust the first estimated latency to be closer to the first access latency and reduce the difference.

3. The method of claim 1, wherein at least one of the plurality of first indexes comprises a bandwidth of the first memory.

4. The method of claim 1, wherein at least one of the plurality of first indexes comprises a reciprocal of an operation frequency of the first memory.

5. The method of claim 1, wherein at least one of the plurality of first indexes comprises a reciprocal of an operation frequency of an interface for the first memory.

6. The method of claim 1, wherein at least one of the plurality of first indexes comprises a reciprocal of a parameter corresponding to a transaction priority.

7. The method of claim 1, wherein at least one of the plurality of first indexes comprises a parameter corresponding to variety of access patterns.

8. The method of claim 1, wherein at least one of the plurality of first indexes comprises a squared value of the bandwidth of the first memory.

9. The method of claim 1, wherein at least one of the plurality of first indexes comprises a ratio of a frequency of the first memory to a frequency of an interface.

10. The method of claim 1, wherein at least one of the plurality of first indexes comprises square of a ratio of a frequency of the first memory to a frequency of an interface.

11. The method of claim 1, wherein at least one of the plurality of first indexes comprises a ratio of a first value to a second value, the first value is a smaller one of a number of read operations and a number of write operations, and the second value is a larger one of the number of read operations and the number of write operations.

12. The method of claim 1, wherein the memory access latency estimation system further comprises a third monitor, and a plurality of fourth monitors, and the method further comprises:

measuring, by the third monitor, a second access latency of a third access operation of a second memory, wherein the second memory comprises a dynamic random-access memory;

measuring, by the plurality of fourth monitors, a plurality of third indexes of the second memory corresponding to the third access operation;

using, by the processor, the plurality of updated first coefficients and the plurality of third indexes to perform a third weighted calculation to generate a third estimated latency;

adjusting, by the processor, the plurality of updated first coefficients to generate a plurality of second coefficients;

using, by the processor, the plurality of second coefficients and the plurality of third indexes to perform the third weighted calculation to adjust the third estimated latency for the third estimated latency to approximate the second access latency;

storing, by the processor, a relationship between the plurality of updated first coefficients corresponding to the first memory and the plurality of second coefficients corresponding to the second memory; and estimating, by the processor, a group of coefficients corresponding to the second memory according to another group of coefficients corresponding to the first memory and the relationship;

wherein the number and the types of the plurality of first indexes are the same as number and types of the plurality of third indexes.

13. A memory access latency estimation system, comprising:

a first monitor configured to measure a first access latency of a first access operation of a first memory, wherein the first memory comprises a dynamic random-access memory;

a plurality of second monitors configured to measure a plurality of first indexes of the first memory corresponding to the first access operation; and a hardware-implemented processor configured to use a plurality of first coefficients and the plurality of first indexes to perform a first weighted calculation to generate a first estimated latency, adjust the plurality of first coefficients to generate a plurality of updated first coefficients using a machine learning model implemented in hardware circuitry of the processor in order to use the plurality of updated first coefficients and the plurality of first indexes to perform the first weighted calculation to adjust the first estimated latency for the first estimated latency to approximate the first access latency, and use the plurality of updated first coefficients and a plurality of second indexes of the first memory to perform a second weighted calculation to generate a second estimated latency for a second access operation;

wherein the processor comprises a member selected from a group comprising a central processing unit (CPU), a graphic processing unit (GPU), a tensor processing unit (TPU), a neural network processing unit (NPU), an application specific integrated circuit (ASIC), a deep learning processing unit (DPU), a vector processing unit (VPU), and a microprocessor, number and types of the plurality of first indexes are the same as number and types of the plurality of second indexes, the plurality of second indexes are corresponding to the second access operation, and the first access operation precedes the second access operation.

14. The memory access latency estimation system of claim 13, further comprising:

a third monitor configured to measure a second access latency of a third access operation of a second memory, wherein the second memory comprises a dynamic random-access memory; and a plurality of fourth monitors configured to measure a plurality of third indexes of the second memory corresponding to the third access operation;

wherein the processor is further configured to use the plurality of updated first coefficients and the plurality of third indexes to perform a third weighted calculation to generate a third estimated latency, adjust the plurality of updated first coefficients to generate a plurality of second coefficients, use the plurality of second coefficients and the plurality of third indexes to perform the third weighted calculation to adjust the third estimated latency for the third estimated latency to approximate the second access latency, store a relationship between the plurality of updated first coefficients corresponding to the first memory and the plurality of second coefficients corresponding to the second memory, and estimate a group of coefficients corresponding to the second memory according to another group of coefficients corresponding to the first memory and the relationship; and the number and the types of the plurality of first indexes are the same as a number and types of the plurality of third indexes.

15. A memory access latency estimation method of a memory access latency estimation system, the memory access latency estimation system comprising a plurality of first monitors, a plurality of second monitors, and a processor, the processor being hardware-implemented, the processor comprising a member selected from a group comprising a central processing unit (CPU), a graphic processing unit (GPU), a tensor processing unit (TPU), a neural network processing unit (NPU), an application specific integrated circuit (ASIC), a deep learning processing unit (DPU), a vector processing unit (VPU), and a microprocessor, the memory access latency estimation method comprising:

measuring, by the plurality of first monitors, a plurality of first indexes of a first dynamic random-access memory;

measuring, by the plurality of second monitors, a plurality of second indexes of a second dynamic random-access memory;

obtaining, by the processor, a relationship between the plurality of first indexes of the first dynamic random-access memory and the plurality of second indexes of the second dynamic random-access memory; and generating, by the processor, a plurality of second coefficients for the second dynamic random-access memory according to the relationship and a plurality of first coefficients of the first dynamic random-access memory;

wherein the plurality of second coefficients are used to estimate an access latency of the second dynamic random-access memory, and number and the types of the plurality of first indexes are the same as number and types of the plurality of second indexes.

16. The method of claim 15, wherein:

the plurality of second coefficients and a group of indexes of the second dynamic random-access memory are used to perform a weighted calculation to estimate the access latency of the second dynamic random-access memory.

* * * * *